US00RE39701E

(19) United States
(12) Reissued Patent
Hong et al.

(10) Patent Number: US RE39,701 E
(45) **Date of Reissued Patent: *Jun. 26, 2007**

(54) CLUTCH DEVICE FOR MAGNETIC RECORDING/REPRODUCING APPARATUS

(75) Inventors: Sung Pyo Hong, Suwon (KR); Ji Young Lee, Pyeongtaeg (KR); You Seok Chae, Suwon (KR)

(73) Assignee: LG Electronics Inc., Seoul (KR)

( * ) Notice: This patent is subject to a terminal disclaimer.

(21) Appl. No.: 11/371,092

(22) Filed: Mar. 8, 2006

Related U.S. Patent Documents

Reissue of:
(64) Patent No.: 6,702,080
Issued: Mar. 9, 2004
Appl. No.: 10/006,658
Filed: Dec. 10, 2001

(30) Foreign Application Priority Data

Dec. 11, 2000 (KR) ..... 2000-0075320

(51) Int. Cl.
*G11B 15/44* (2006.01)

(52) U.S. Cl. ..... 192/48.6; 192/12 BA; 192/41 S; 192/55.1; 192/56.2; 74/354

(58) Field of Classification Search ..... None
See application file for complete search history.

(56) References Cited

U.S. PATENT DOCUMENTS 2,895,578 A 7/1959 Winchell
2,896,873 A 7/1959 Mageoch
4,681,281 A 7/1987 Aarts et al.
4,760,751 A 8/1988 Kasamatsu
4,762,434 A 8/1988 Hirano
4,763,764 A 8/1988 Smith
4,964,589 A 10/1990 Okada
5,003,418 A 3/1991 Yang
5,472,151 A 12/1995 Choi et al.
5,499,777 A 3/1996 Ahn
5,511,738 A 4/1996 Seo et al.
5,735,476 A 4/1998 Kim et al.
5,788,175 A 8/1998 Hwang

*Primary Examiner*—Saul Rodriguez
(74) *Attorney, Agent, or Firm*—Birch, Stewart, Kolasch & Birch, LLP

(57) ABSTRACT

A clutch device for a magnetic recording/reproducing apparatus for transmitting power for a tape conveying regardless of the quantity of tape wound around a reel, including a [rotating] central shaft installed on a main chassis, a drive pulley connected to the [rotating] central shaft, and having a cylindrical pulley holder portion, said drive pulley being rotated by receiving power from a driving source, an up/down gear having a cylindrical gear holder unit with the outer diameter thereof being smaller than the inner diameter of the pulley holder portion and ascendable/descendable along the [rotatable] central shaft, and a clutch spring placed between the inner surface of the pulley holder portion and the outer surface of the gear holder unit for selectively transmitting power with a certain torque from the driving pulley to the up/down gear in accordance with the rotational direction of the driving pulley.

20 Claims, 6 Drawing Sheets

CLUTCH DEVICE FOR MAGNETIC RECORDING/REPRODUCING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a magnetic recording/reproducing apparatus, and in particular to a clutch device for a magnetic recording/reproducing apparatus which is capable of transmitting power for regularly conveying a tape, regardless of the quantity of the tape, wound around a reel.

2. Description of the Prior Art

FIG. 1 illustrates a tape path conveying structure of a general magnetic recording/reproducing apparatus.

As shown in FIG. 1, a supplying reel driving body 1 and a winding reel driving body 21 are installed to drive a supplying reel (not shown) and a winding reel (not shown) of a tape cassette (not shown) at one side of a main chassis (C).

A plurality of posts and guide rollers are provided on the main chassis (C) to guide the path of a tape (T) released from a tape cassette.

A tension post 3 for controlling the tensile force of the travelling tape (T) is installed on a tension arm 4.

The tension arm 4 is rotated at a predetermined angle according to the tension of the tape (T) on the main chassis (C) centering around a shaft pin 2, on which the tension arm 4 is elastically supported by a spring 5.

The tape (T) having passed the tension post 3 is guided by a guide post 6 and transmitted to a full width erasing head 7.

The full width erasing head 7 removes, in advance, a signal which has been recorded on the tape in a recording mode.

An inertia roller is installed at a position past the full width erasing head 7 to guide the path of the tape (T).

Next, the tape (T) is guided by guide posts 10 and 11 of the supplying and winding side which are moved along loading paths formed at both sides of a rotational head drum 9.

The guide posts 10 and 11 draw the tape (T) from the inside of the tape cassette, a position indicated by a dotted line as shown in FIG. 1, so as to be wound and traveled.

A supplying slant post 12 and a winding slant post 13 are provided next to the guide posts 10 and 11 and in the direction of the rotational head drum 9, so as to guide the conveyance of the tape (T).

The guide posts 10 and 11 and the slant posts 12 and 13 are installed on respective supplying and winding slant bases 14 and 15 and moved along the loading path.

As shown in FIG. 1, the rotational head drum 9, on which the tape (T) is wound and conveyed, is provided with a rotational head (not shown) for reading a signal recorded on the tape (T) or for recording a signal.

The tape (T) passes the rotational head drum 9 and the slant post 13 and the guide post 11 of the winding side and then passes the audio control head 16. The audio control head 16 deletes, records and reproduces an audio signal, and records and reproduces a control signal.

A guide post 17 is provided on the main chassis (C), adjacent to the audio control head 16 for controlling the traveling height of the tape (T).

A capstan shaft 18 for providing a traveling force to the tape (T) is installed at a position past the guide post 17. The capstan shaft 18 is an output shaft of a capstan motor (not shown) installed at the opposite face of the main chassis (C), and the traveling direction of the tape (T) is determined by the rotational direction of the capstan motor.

A pinch, roller 19 is selectively installed to tightly engage the capstan shaft 18 to provide a force for pulling the tape (T).

A winding post 20 is provided adjacent to the location of the pinch roller 19 and the capstan shaft 18. A winding arm (not shown) is installed and moved at the winding post 20.

Between the supplying reel driving body 1 and the winding reel driving body 21, a clutch assembly 22 is installed to drive the supply reel or the winding reel at a certain torque, regardless of the amount of tape (T) wound on the supplying reel or the winding reel, upon receipt of a driving force received from the capstan motor.

An idler gear 24 is installed at a front end of an idler arm 25 which is coaxially installed with the clutch assembly 22. The idler gear 24 is adopted to selectively engage either the supply reel driving body 1 or the winding reel driving body 21 for transferring a driving force thereto upon receipt of the driving force from the clutch assembly 22.

A tension brake 27 is wound on the supplying reel driving body 1 with both of its ends fixed to the tension arm 4. The tension brake 27 controls the rotational speed of the supplying reel driving body 1 according to the operation of the tension arm 4, thereby controlling the tension in the tape (T).

The construction of the clutch assembly 22 will be described in detail with reference to accompanying FIGS. 2 and 3.

As depicted in FIGS. 2 and 3, a central shaft 30 is installed on the main chassis C. A driving pulley 32d is installed so as to rotate centering around the central shaft 30. A belt 31 which receives power from the capstan motor is wound around the driving pulley 32d for transferring the rotational force of the capstan motor. A cylindrical clutch holder 34 is installed on the driving pulley 32.

A an up/down gear 36 is installed on the central shaft 30 on the same axis as the driving pulley 32d. The up/down gear 36 transmits the power from the capstan motor by selectively engaging the idler gear 24. Clutch springs 18, 18' are installed to the up/down gear 36. The clutch springs 18, 18' are wound around the outer circumferential surface of the cylindrical clutch holder 34. Herein, the lower spring 18 and the upper spring 18' are wound in the opposite directions.

According to the rotational direction of the driving pulley 32d, for example, when the lower spring 18 is locked and the upper spring 18' rubs against the surface of the clutch holder 34, a slip occurs. Accordingly, the movement of the tape (T) can be performed with a regular torque regardless of the quantity of the tape (T) wound around the reel.

In the meantime, a first gear portion 37 and a second gear portion 37' are formed on the up/down gear 36, the first and the second gear portions 37, 37' reducing and transmitting power by respectively and selectively engaging with gear portions of the idler gear 24.

The idler gear 24 is rotatably installed on the front end portion of the idler arm 25, centering around the central shaft 30, each gear portion (not shown) selectively engaging the first and the second gear portions 37, 37' of the up/down gear 36. The idler gear 24 transmits the power of the capstan motor to the supplying reel and the winding reel by selectively engaging with the supply reel body 1 and the winding reel body 21.

However, the above-mentioned conventional magnetic recording/reproducing apparatus has the following problems.

The clutch springs 18, 18' are selectively used for conveying the tape (T) with a regular tension, regardless of the quantity of tape (T) wound around the supply reel and the winding reel in accordance with a traveling direction of the tape (T).

In this use of clutch springs 18, 18', production costs are increased due to the large amount of construction parts. In addition, the operation efficiency of the assembly process is reduced.

SUMMARY OF THE INVENTION

In order to solve above-mentioned problems, it is an object of the present invention to provide a clutch device for a magnetic recording/reproducing apparatus which is capable of reducing production cost and improving the efficiency of the assembly operation by minimizing the number of components.

In order to achieve the above-mentioned object, a clutch device for a magnetic recording/reproducing apparatus is provided which includes a [rotating] central shaft installed on a main chassis; a driving pulley installed on the [rotating] central shaft which rotates by receiving power from a driving source and having a cylindrical pulley holder portion; an up/down gear containing a cylindrical gear holder unit having an outer diameter smaller than an inner diameter of the pulley holder portion and being ascendable/descendable along a [rotating] central shaft; and a clutch spring placed between the inner surface of the pulley holder portion and the outer surface of the gear holder unit for selectively transmitting power with a certain torque from the driving pulley to the up/down gear in accordance with the rotational direction of the driving pulley.

The clutch spring has a coil spring structure, with the end of the clutch spring contacting the inner surface of the pulley holder portion, and the other end of the clutch spring contacting the outer surface of the gear holder unit.

Certain portions of the pulley holder portion and the gear holder unit are formed so as to project out toward the clutch spring in order to engage the clutch spring.

The gear holder unit includes an outer cylindrical portion having an inner diameter larger than an inner diameter of the pulley holder portion and connected to the pulley holder portion.

The driving pulley and the up/down gear respectively include an engaging means which enables them to mesh and rotate together when the up/down gear is transferred toward the driving pulley.

The driving pulley and the up/down gear respectively include a movement restriction means restricting the up/down gear from moving in a specific range when the up/down gear moves in a direction separated from the driving pulley.

The up/down gear is constructed with a gear unit having a large gear and a small gear and a gear holder unit, and the gear unit and the gear holder unit are combined with each other.

A boss portion is formed at the center of the gear unit, with the large gear being formed at a disc-shaped portion which extends from the boss portion. The small gear which has a diameter smaller than the diameter of the large gear is formed at the side of the disc-shaped portion.

A cylindrical holder supporting portion is formed at the other side of the gear unit so as to support the gear holder unit.

The gear holder unit is constructed with an inner cylindrical portion and an outer cylindrical portion, and the clutch spring contacts the inner cylindrical portion, and an engaging rib is formed at the outer cylindrical portion.

The inner cylindrical portion has a hook structure for engaging with the drive pulley.

The drive pulley of a clutch device for a magnetic recording/reproducing apparatus includes a pulley body formed as a disc shape with a belt wound around the outer circumference thereof; a boss portion combined with a [rotating] central shaft; a bridge portion projected so as to restrict the movement of an up/down gear; a pulley holder portion having an inner surface in contact with a clutch spring; and an engaging rib combined with an up/down gear for rotating together; wherein the boss portion, the bridging portion, the pulley holder portion and the engaging rib are formed in a cylindrical shape and orderly positioned from the center of the pulley body.

A clutch spring of a clutch device for a magnetic recording/reproducing apparatus includes an inner contacting portion for engaging an up/down gear and having a plurality of windings, an outer contacting portion for engaging a drive pulley and having a plurality of windings, and a connecting portion connecting the inner contacting portion and the outer contacting portion and containing a plurality of windings less than those of the inner contacting portion and the outer contacting portion.

The diameter of the inner contacting portion is formed to be smaller than the diameter of the outer contacting portion.

Accordingly, a clutch device for a magnetic recording/reproducing apparatus in accordance with the present invention is capable of reducing a production cost and improving the efficiency of an assembly operation by minimizing the number of components.

DETAILED DESCRIPTION OF THE PREFERRED EMBODIMENT

Hereinafter, the preferred embodiments of a clutch device for a magnetic recording/reproducing apparatus in accordance with the present invention will be described with reference to accompany drawings.

Although there may be a plurality of embodiments of a magnetic recording/reproducing apparatus in accordance with the present invention, hereinafter the preferred embodiment will be described.

Figure 1:
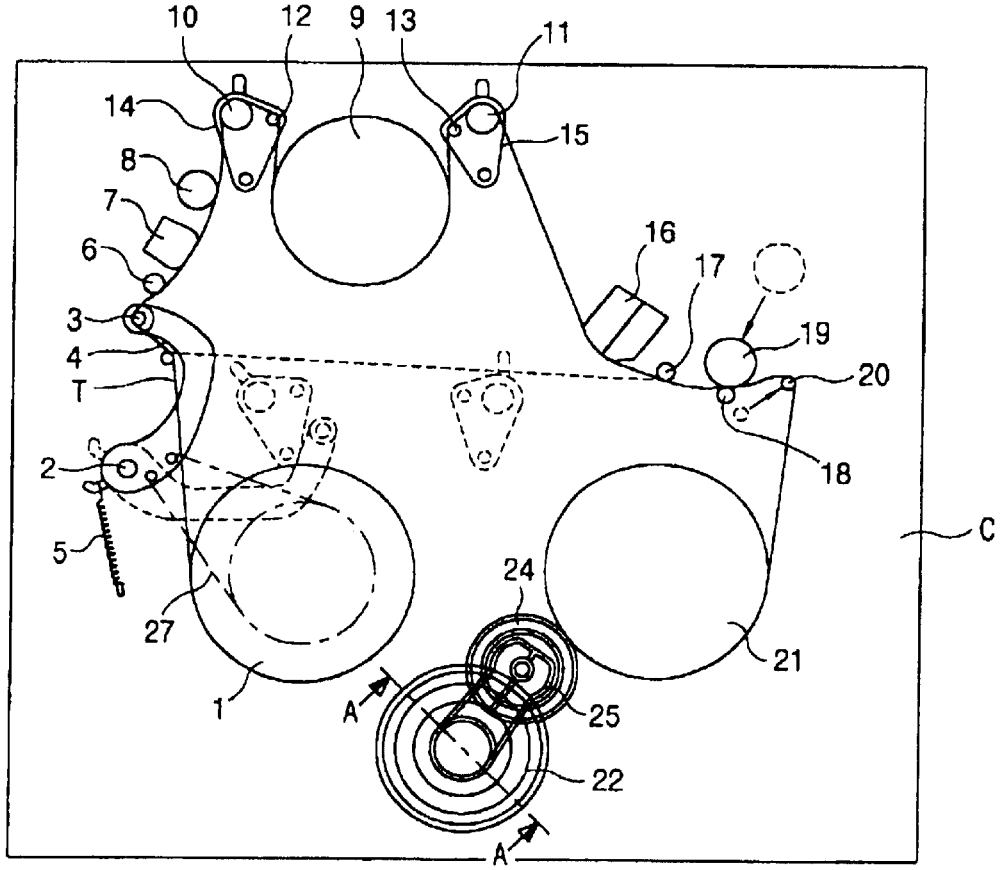
FIG. 1 PRIOR ART
FIG. 1 is a plan view showing a tape conveying structure of a general magnetic recording/reproducing apparatus.
Figure 2:
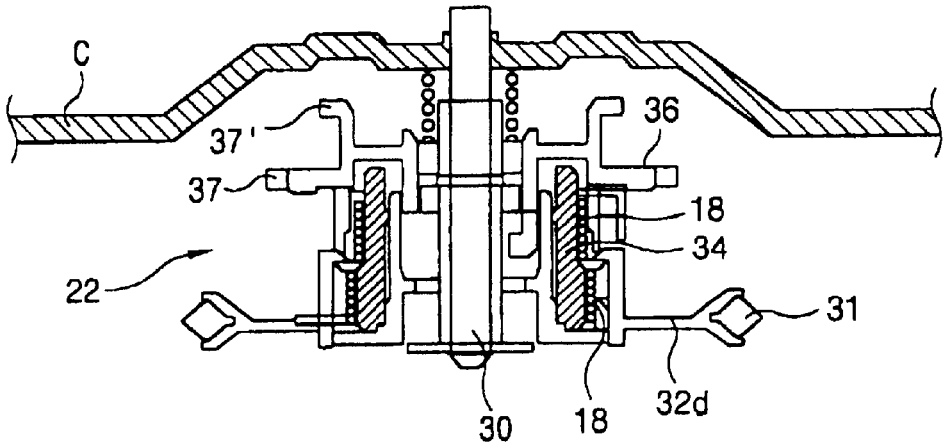
FIG.2 PRIOR ART
FIG. 2 is a sectional view illustrating the structure of a clutch device for the magnetic recording/reproducing apparatus taken along the line A—A of FIG. 1.
Figure 3:
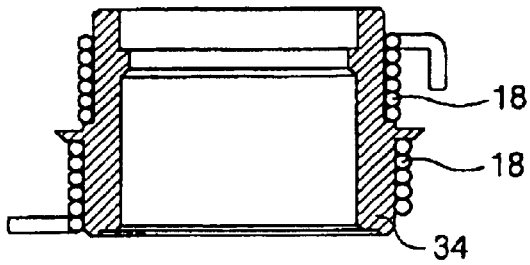
FIG.3 PRIOR ART
FIG. 3 illustrates, in detail, the combination structure of the clutch holder and the spring of FIG. 2.
Figure 4:
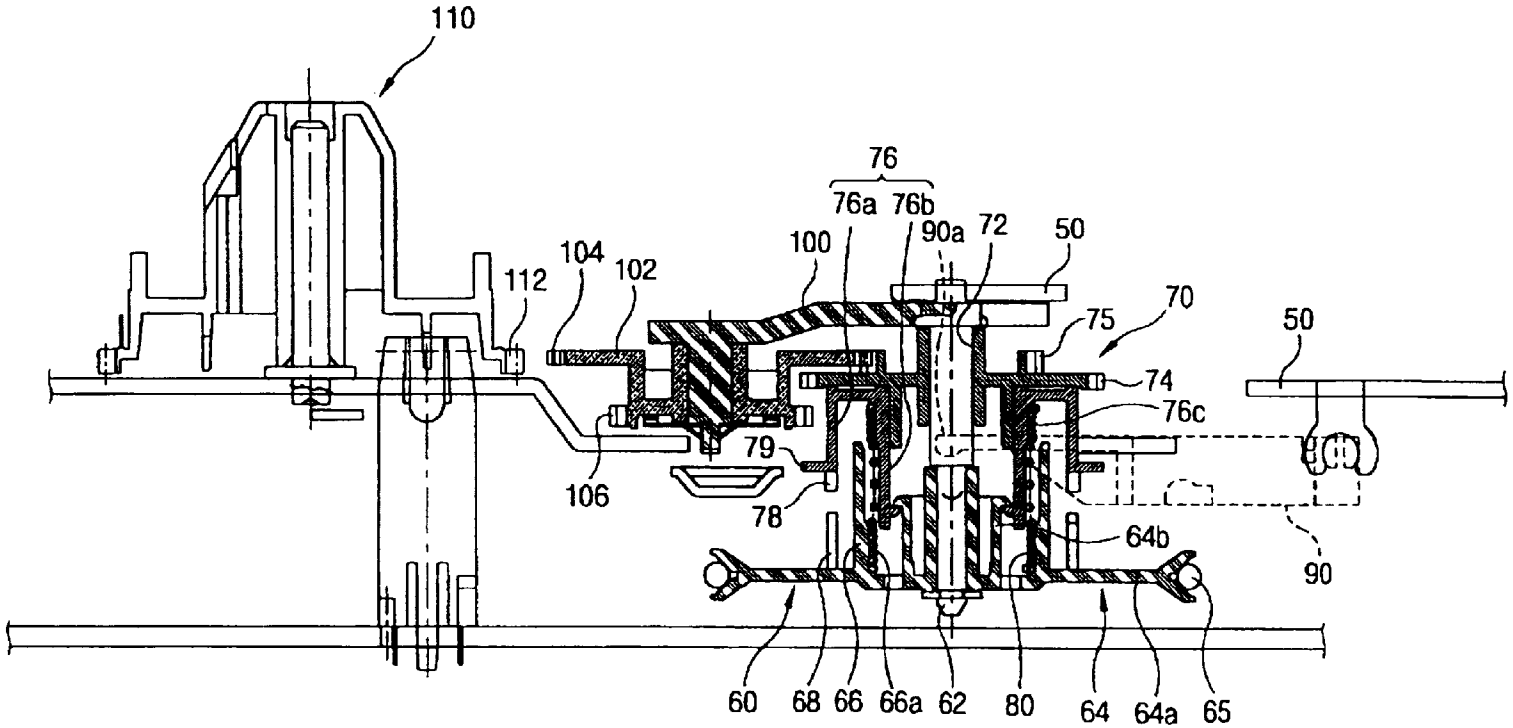
FIG. 4 is a sectional view illustrating a clutch device for a magnetic recording/reproducing apparatus in accordance with the present invention.

As depicted in FIG. 4, a clutch assembly 60 is installed on a main chassis 50. In conveying a tape T by transmitting power provided from a capstan motor to a supply reel and a winding reel, the clutch assembly 60 performs the conveyance of the tape T with a regular tension, regardless of the quantity of the tape T wound around the supply reel and winding reel.

In the structure of the clutch assembly 60, a central shaft 62 is formed on the main chassis 50. A driving pulley 64 is rotatably installed at the central shaft 62. The driving pulley 64 receives power transmitted from the capstan motor through a belt 65, and a cylindrical pulley holder 66 is formed at the inside of the driving pulley 64 on the same axis as the central shaft 62. An engaging rib 68 is formed on the driving pulley 64, exterior to the pulley holder 66.

An up/down gear 70 is installed to the central shaft 62 so as to move in an axial direction along the central shaft 62. A sliding hole 72 in which the central shaft 62 penetrates is formed at the center of the up/down gear 70. A large gear 74 and a small gear 75 are formed on the up/down gear 70 in order to transmit power received from the driving pulley 64 to an idler gear 102. The large gear 74 engages with the small gear 106 of the idler gear 102 in a fast traveling mode, and the smaller gear 75 engages with the large gear 104 of the idler gear 102 in a normal traveling mode for transmitting power.

A gear holder 76 is formed at the up/down gear 70 so as to face with the pulley holder 66 of the drive pulley 64. The gear holder 76 has a cylindrical shape in which an inner cylindrical portion 76b and an outer cylindrical portion 76a having the same axis as the [centrical] *central* shaft 62 are connected to each other. The inner cylindrical portion 76b of the gear holder 76 is inserted into the pulley holder 66 so as to be ascendable. Accordingly, the outer diameter of the inner cylindrical portion 76b of the gear holder 76 is formed so as to be smaller than the inner diameter of the pulley holder 66.

An engaging rib 78 is formed at the outer cylindrical portion 76a of the gear is holder 76 in order to rotate the up/down gear 70 and the drive pulley 64 as one body in the fast traveling mode by engaging with them when the up/down gear 70 moves toward the drive pulley 64.

The drive pulley 64 includes a movement restriction means in order to restrict the up/down gear 70 not to move over a specific range when the up/down gear 70 moves in a direction separated from the drive pulley 64.

In more detail, a cylindrical bridging portion 64b is formed so as to project into the gear holder unit 76, and the movement restriction means is formed so as to engage the bridging portion 64b with the inner cylindrical portion 76b of the gear holder 76 as a hook structure.

Figure 6:
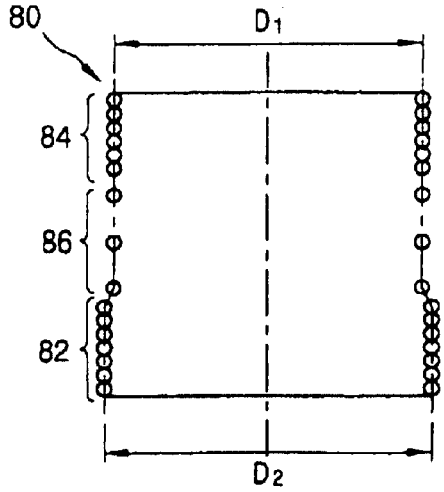
FIG. 6 is a sectional view illustrating the structure of a clutch spring of the clutch device in accordance with the present invention.

A clutch spring 80 is installed between the drive pulley 64 and the up/down gear 70. The clutch spring 80 is constructed as a coil spring structure. As depicted in FIG. 6, in the clutch spring 80, an outer contacting portion 82 is formed at the lower portion thereof so as to contact the inner surface of the pulley holder 66 of the driving pulley 64. The inner contacting portion 84 is formed at the upper portion so as to contact the outer surface of the gear holder 76. The outer contacting portion 82 and the inner contacting portion 84 are connected to each other through a connecting portion 86.

In the connecting portion 86, connecting the outer contacting portion 82 and the inner contacting portion 84 in order to form the clutch spring 80 as one body, the number of windings is less than those of the outer contacting portion 82 or the inner contacting portion 84.

The clutch spring 80 is wound when it is rotated in one direction and is unwound when it is rotated in the other direction. The outer contacting portion 82 and the inner contacting portion 84 are in contact with the inner surface of the pulley holder 66 and the outer surface of the gear holder 76, respectively.

Accordingly, when the driving pulley 64 rotates in a certain direction, the outer contacting portion 82 and the pulley holder 66 closely contact each other, while the contact of the inner contacting portion 84 and the gear holder 76 is loosened. Accordingly a specific torque is transmitted by a slip. When the driving pulley 64 rotates in the other direction, the inner contacting portion 84 and the gear holder 76 closely contact each other and the contact between the outer contacting portion 82 and the pulley holder 66 is loosened. Accordingly, a specific torque is transmitted by a slip.

Herein, in the pulley holder 66 and the gear holder 76, the inner portion 66a and the outer portion 76c are formed so as to project toward the clutch spring 80 in order to smoothly contact the clutch spring 80.

Figure 5:
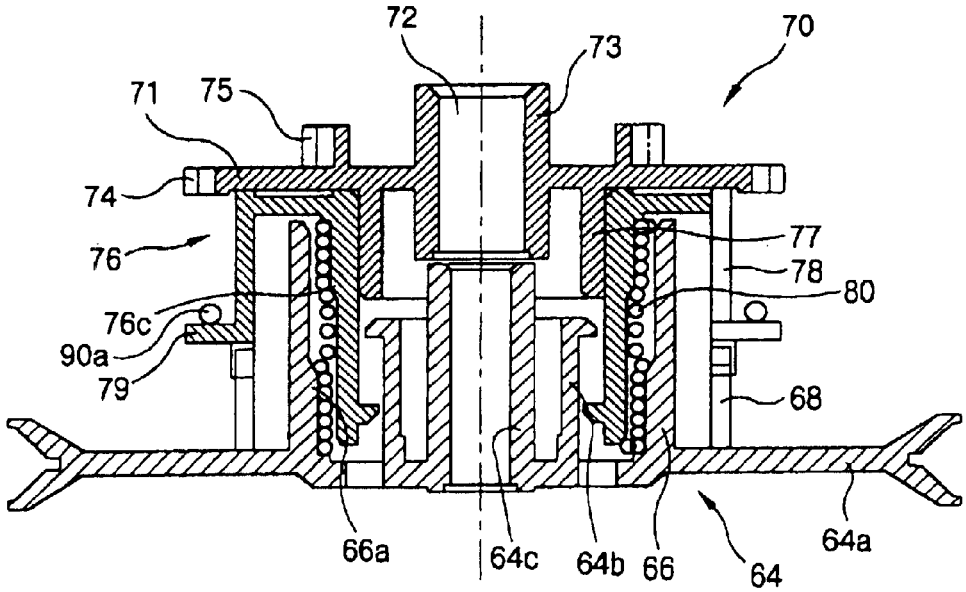
FIG. 5 is a sectional view illustrating a combination structure of a drive pulley, an up/down gear and a clutch spring.

In the meantime, the driving pulley 64, the up/down gear 70 and the clutch spring 80 are described in more detail with reference to accompanying FIGS. 5 and 6.

First, the drive pulley 64 includes a pulley body 64a having a disc shape in which a belt is wound on the outer circumference, a boss portion 64c combined with the [rotation] central shaft 62, a bridging portion 64b projecting in order to restrict the movement of the up/down gear 70 by combining with the inner cylindrical portion 76b of the up/down gear 70 as a hook structure, a pulley holder 66 with its inner surface in contact with the clutch spring 80, and an engaging rib 68 combined with the up/down gear 70 so as to enable them to rotate together.

The boss portion 64c, the bridging portion 64b, the pulley holder 66 and the engaging rib 68 have a cylindrical shape and are orderly placed from the center of the pulley body 64a.

Next, the up/down gear 70 includes a gear unit 71 having a large gear 74 a small gear 75 and gear holder 76, and the gear unit 71 and the gear holder 76 are combined with each other.

In the gear unit 71, a boss portion 73 having a sliding hole 72 is formed at the central portion, a large gear 74 is formed at the disc-shaped portion extended from the boss portion 73, and a small gear 75 having a diameter smaller than a diameter of the large gear projects from the side of the disc-shaped portion.

In addition, a cylindrical holder supporting portion 77 is formed at the gear unit 71, opposite to the small gear 75 in order to support the gear holder 76.

In the clutch spring 80, as depicted in FIG. 6, the diameter D1 of the inner contacting portion 84 is smaller than the diameter D2 of the outer contacting portion 82.

In the meantime, a converting lever 90 is installed on the main chassis 50 in order to ascend and descend the up/down gear 70. The converting lever 90 is operated by an additional driving member (not shown). An idler arm 100 is installed to rotate at a certain angle centering around the central shaft 62. An idler gear 102 is installed at the idler arm 100. A large gear 104 and a small gear 106 are formed at the idler gear 102. Accordingly the idler gear 102 receives power by engaging with the small gear 75 and the large gear 74 of the up/down gear 70.

As depicted in FIG. 4, reference numeral 110 is a supply reel body for operating the supply reel of a tape. A slave gear 112 which selectively engages with the large gear 102 of the idler gear 102 is formed at the supply reel body 110. A winding reel body is formed at the opposite side of the supply reel body.

The operation of the clutch device for a magnetic recording/reproducing apparatus in accordance with the present invention will now be described in detail.

The clutch assembly 60 transmits a regular torque to the supply reel body 110 and the winding reel body (not shown) for conveying the tape T with a regular tension, regardless of the quantity of the tape T wound around the supply reel of the winding reel.

In more detail, when the rotational force of the capstan motor is transmitted through the belt 65, power is transmitted through the drive pulley 64, the clutch spring 80, the up/down gear 70 and the idler gear 102.

The power transmission process will be described with reference to accompanying FIGS. 7A, 7B, 8A and 8B.

Figure 7A:
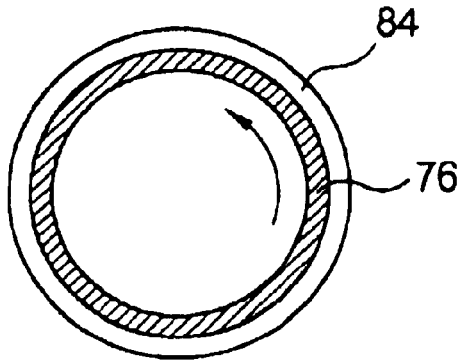
FIGS. 7A, 7B, 8A and 8B are diagrams illustrating the operation of the clutch device in accordance with the present invention.
Figure 7B:
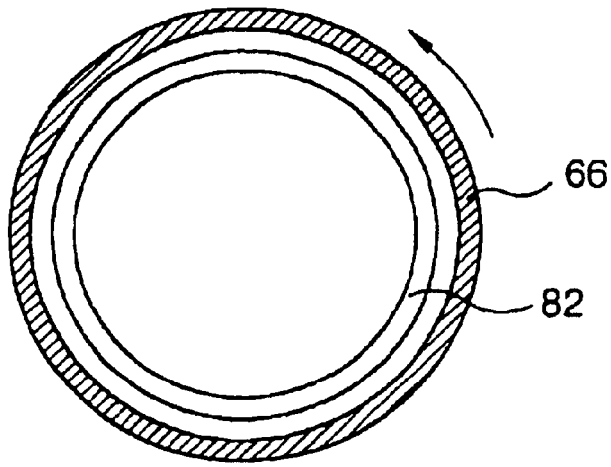

For example, as depicted in FIGS. 7A and 7B, when the driving pulley 64 rotates in the counter clockwise direction, when the rotational direction of the driving pulley 64 is the same with the winding direction of the clutch spring 80 (shortening a diameter), the inner contacting portion 84 of the clutch spring 80 is in close contact with the exterior of the gear holder 76, and contact of the outer contacting portion 82 of the clutch spring 80 with the inner surface of the pulley holder 66 is loosened (This is exaggerated in FIGS. 7A and 7B).

Then, a slip occurs between the outer contacting portion 82 and the pulley holder 66 so that regular power can be transmitted.

Figure 8A:
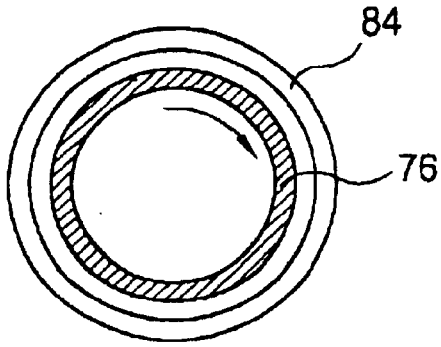
Figure 8B:
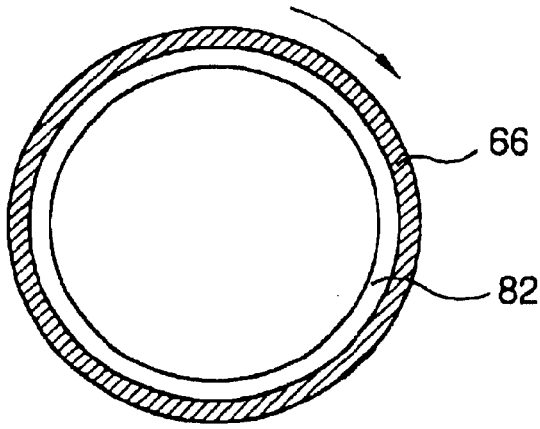

In the meantime, as depicted in FIGS. 8A and 8B, when the driving pulley 64 rotates in the clockwise direction, the diameter of the clutch spring 80 is lengthened. Herein, the inner contacting portion 84 is loosened from the gear holder so that a slip occurs there-between. Accordingly, specific power can be transmitted the outer contacting portion 82 is in close contact with the inner is surface of the pulley holder 66.

In the meantime, as depicted in FIG. 4, the converting lever 90 is rotatively installed on the main chassis 50. In more detail, the end of the converting lever 90 is hinge-connected to the main chassis 50, and the other end of the converting lever 90 is placed on a protrusion portion 79 projecting from the outer circumference of the outer cylindrical portion 76a of the gear holder 76.

When the converting lever 90 is rotated at the hinge portion by an additional driving member (not shown) installed on the main chassis 50, the end of the converting lever 90 rotates downwardly. Accordingly, the protrusion portion 79 is pushed, the gear holder 76 moves downwardly in FIG. 4, and the engaging rib 78 of the gear holder 76 combines with the engaging rib 68 of the driving pulley 64. Herein, the connecting portion 86 of the clutch spring 80 generates an elastic force moving the gear holder 76 upwardly while being compressed. This is described in FIG. 5.

Accordingly, the rotational force of the driving pulley 64 is directly transmitted to the gear holder 76 through the engaging ribs 68, 78 without transmitting the torque of the clutch spring 80.

As described above, in a clutch assembly for a magnetic recording/reproducing apparatus in accordance with the present invention, the interior of the upper portion and the exterior of the lower portion of a clutch spring are respectively in contact with a gear holder of an up/down gear and a pulley holder of a driving pulley. The position at which a slip occurs is varied according to the rotational direction of the driving policy, and a regular torque can be transmitted. Accordingly, a torque adjustment according to the two-way rotation of the driving pulley can be performed with one spring.

Accordingly, a clutch device for a magnetic recording/reproducing apparatus in accordance with the present invention can reduce production cost and simplify the assembly process by minimizing the number of components.

What is claimed is:

1. A clutch device for a magnetic recording/reproducing apparatus comprising*:* a [rotating] central shaft installed in a main chassis;

a driving pulley installed to the [rotating] central shaft, rotating by receiving power of a driving source and having a cylindrical pulley holder portion;

an up/down gear having a gear holder unit which includes an outer cylindrical portion having an inner diameter larger than an outer diameter of the pulley holder portion and connected to the pulley holder portion and ascendable/descendable along the [rotating] central shaft; and a clutch spring placed between the inner surface of the pulley holder portion and the outer surface of the gear holder unit for selectively transmitting power with a certain torque from the drive pulley to the up/down gear in accordance with the rotational direction of the drive pulley.

2. A clutch device for a magnetic recording/reproducing apparatus comprising*:* a [rotating] central shaft installed in a main chassis;

a driving pulley installed to the [rotating] central shaft, rotating by receiving power of a driving source and having a cylindrical pulley holder portion;

an up/down gear having a cylindrical gear holder unit having an outer diameter smaller than an inner diameter of a pulley holder portion and ascendable/descendable along the [rotating] central shaft, wherein the driving pulley and the up/down gear respectively include an engaging means which enables then to mesh and rotate together when the up/down gear is transferred toward the driving pulley, [an] *and* wherein the gear holder unit includes an outer cylindrical portion having the inner diameter larger than the outer diameter of the pulley holder portion and connected to the pulley holder portion, and the engaging means includes two engaging ribs respectively projecting from the outer cylindrical portion and the driving pulley so as to face each other.

3. A clutch device for a magnetic recording/reproducing apparatus, comprising[;]*:* a central shaft installed on a main chassis;

a drive pulley having a cylindrical pulley holder extending therefrom, said drive pulley installed on the central shaft and rotated by receiving power from a drive source;

an up/down gear having a cylindrical gear holder unit and ascendable/descendable along the central shaft; and a clutch spring placed between the gear holder unit for selectively transmitting power with a certain torque from the drive pulley to the up/down gear in accordance with the rotational direction of the drive pulley;

wherein the clutch spring is connected to the pulley holder portion and the gear holder unit, and the gear holder unit includes an outer cylindrical portion having an inner diameter larger than an outer diameter of the pulley holder portion and connected to the pulley holder portion.

4. A clutch device for a magnetic recording/reproducing apparatus, comprising:

a [rotatable] central shaft installed on a main chassis;

a drive pulley having a cylindrical pulley holder portion, extending therefrom, said drive pulley connected to said [rotatable] central shaft for rotation therewith;

driving means operatively connected to the drive pulley for rotating the drive pulley;

an up/down gear having a cylindrical gear holder unit with an outer diameter thereof being smaller than an inner diameter of the pulley holder portion and ascendable/descendable along the [rotatable] central shaft; and a clutch spring placed between the inner surface of the pulley holder portion and the outer surface of the gear holder unit for selectively transmitting power with a certain torque from the drive pulley to the up/down gear in accordance with the rotational direction of the drive pulley; wherein certain portions of the pulley holder portion and the gear holder unit are formed so as to project out toward the clutch spring in order to contact with the clutch spring.

5. The device of claim 4, wherein the clutch spring has a coil spring structure.

6. The device of claim 4, wherein one end of the clutch spring is in contact with the inner surface of the pulley holder portion, and the other end of the clutch spring is in contact with the outer surface of the gear holder unit.

7. The device of claim 4, wherein the gear holder unit includes an outer cylindrical portion having an inner diameter larger than an outer diameter of the pulley holder portion and connected to the pulley holder portion.

8. The device of claim 4, wherein the driving pulley and the up/down gear respectively include an engaging means in order to rotate together by being meshed with each other when the up/down gear is transferred toward the driving pulley.

9. The device of claim 8, wherein the gear holder unit includes an outer cylindrical portion having the inner diameter larger than the outer diameter of the pulley holder portion and connected to the pulley holder portion, and the engaging means includes two engaging ribs respectively projecting from the outer cylindrical portion and the driving pulley so as to face each other.

10. The device of claim 4, wherein the driving pulley and the up/down gear respectively include a movement restriction means restricting the movement of the up/down gear over a specific range when the up/down gear moves in a direction separated from the driving pulley.

11. The device of claim 10, wherein the movement restriction means projects from the driving pulley and the up/down gear, respectively, in order to be engaged each other as a hook structure.

12. The device of claim 10, wherein the drive pulley has a cylindrical bridging portion which projects out into the gear holder unit, and the movement restriction means hitch the bridging portion and the gear holder unit as a hook structure.

13. The device of claim 4, wherein the up/down gear is constructed with a gear unit having a large gear and a small gear and said gear holder unit, and the gear unit and the gear holder unit are combined with each other.

14. The device of claim 13, wherein a boss portion is formed at the center of the gear unit, the large gear is formed at a disc-shaped portion extending from the boss portion, and the small gear, having a diameter smaller than a the diameter of the large gear, is formed at the side of the disc-shaped portion.

15. The device of claim 13, wherein a cylindrical holder supporting portion is formed at the other side of the gear unit so as to support the gear holder unit.

16. The device of claim 13, wherein the gear holder unit is constructed with an inner cylinder portion and an outer cylinder portion, the clutch spring is in contact with the inner cylinder portion, and an engaging rib is formed at the outer cylindrical portion.

17. The device of claim 16, wherein the inner cylindrical portion has a hook structure so as to engage with the drive pulley.

18. A magnetic recording/producing apparatus containing the clutch device of claim 4.

19. A clutch device for a magnetic recording/reproducing apparatus, comprising:

a [rotatable] central shaft installed on a main chassis;

a drive pulley having a cylindrical pulley holder portion, extending therefrom, said drive pulley connected to said [rotatable] central shaft for rotation therewith;

driving means operatively connected to the drive pulley for rotating the drive pulley;

an up/down gear having a cylindrical gear holder unit with an outer diameter thereof being smaller than an inner diameter of the pulley holder portion and ascendable/descendable along the [rotatable] central shaft; and a clutch spring placed between the inner surface of the pulley holder portion and the outer surface of the gear holder unit for selectively transmitting power with a certain torque from the drive pulley to the up/down gear in accordance with the rotational direction of the drive pulley, wherein the clutch spring includes an outer contacting portion producing friction by contacting to the inner surface of the pulley holder portion, an inner contacting portion producing friction by contacting the outer surface of the gear holder unit and a connecting portion connecting the outer contacting portion and the inner contacting portion.

20. The device of claim 19, wherein the connecting portion is formed so as to have the number of windings less than those of the inner contacting portion and the outer contacting portion.

* * * * *